US012478195B2

United States Patent
Lyons et al.

(10) Patent No.: US 12,478,195 B2
(45) Date of Patent: Nov. 25, 2025

(54) DETACHABLE HOPPER BULK DISPENSER

(71) Applicant: Retail Space Solutions LLC, Milwaukee, WI (US)

(72) Inventors: Christopher Lyons, Western Springs, IL (US); Craig Pavlich, Glen Ellyn, IL (US); Shaji Veettil, Little Rock, AR (US)

(73) Assignee: Retail Space Solutions LLC, Milwaukee, WI (US)

( * ) Notice: Subject to any disclaimer, the term of this patent is extended or adjusted under 35 U.S.C. 154(b) by 146 days.

(21) Appl. No.: 18/331,597

(22) Filed: Jun. 8, 2023

(65) Prior Publication Data
US 2023/0397742 A1    Dec. 14, 2023

Related U.S. Application Data

(60) Provisional application No. 63/351,246, filed on Jun. 10, 2022.

(51) Int. Cl.
*A47F 1/035* (2006.01)

(52) U.S. Cl.
CPC .................... *A47F 1/035* (2013.01)

(58) Field of Classification Search
CPC . A47F 1/035; A47F 1/03; G07F 11/44; B05C 17/00506; B05C 17/00513; B65D 25/48; G01F 11/24
See application file for complete search history.

(56) References Cited

U.S. PATENT DOCUMENTS

| | | | | |
|---|---|---|---|---|
| 1,215,531 A | * | 2/1917 | Hill et al. | G01F 11/24 |
| | | | | 222/360 |
| 1,272,828 A | * | 7/1918 | Madsen | A01C 7/04 |
| | | | | 222/367 |
| 4,266,695 A | * | 5/1981 | Ruperez | G01F 11/24 |
| | | | | 222/339 |
| 4,473,175 A | | 9/1984 | Zengaffinen et al. | |
| 4,903,866 A | | 2/1990 | Loew | |
| 5,285,925 A | | 2/1994 | Leight | |
| 5,437,393 A | | 8/1995 | Blicher et al. | |
| 5,551,604 A | * | 9/1996 | Kern | G01F 11/22 |
| | | | | 222/368 |

(Continued)

FOREIGN PATENT DOCUMENTS

CA    2167324    7/1996
EP    3542678    9/2019

(Continued)

OTHER PUBLICATIONS

Extended European Search Report for European Patent Application No. 23178416.6, dated Sep. 7, 2023.

(Continued)

*Primary Examiner* — Donnell A Long
(74) *Attorney, Agent, or Firm* — Andrus Intellectual Property Law, LLP

(57) ABSTRACT

A gravity-feed dispensing system includes a hopper configured to hold a bulk material for dispense. The hopper includes a mouth. A dispenser includes a valve operable between open and closed conditions to selectively permit bulk material to pass from the hopper through an outlet of the dispenser. The dispenser is configured to selectively connect the valve to the mouth of the hopper.

17 Claims, 11 Drawing Sheets

(56) References Cited

U.S. PATENT DOCUMENTS

| | | | |
|---|---|---|---|
| 5,613,464 A | 3/1997 | Petzel | |
| 6,182,864 B1 | 2/2001 | Elmore | |
| 6,241,123 B1 | 6/2001 | Elmore | |
| 6,257,464 B1 | 7/2001 | Dalton et al. | |
| 7,178,697 B2 | 2/2007 | Brundick et al. | |
| 8,448,602 B2 | 5/2013 | Lytle | |
| 8,584,714 B2 * | 11/2013 | Gaultney | B01F 35/881 222/77 |
| 8,708,199 B2 | 4/2014 | James | |
| 8,870,024 B2 | 10/2014 | Mendes et al. | |
| 9,278,788 B2 | 3/2016 | Brundick | |
| 10,450,152 B2 | 10/2019 | Brundick et al. | |
| 10,665,051 B2 | 5/2020 | Conway | |
| 11,051,636 B2 | 7/2021 | Sunesson et al. | |
| 2006/0191958 A1 * | 8/2006 | Brundick | A47J 31/404 222/158 |
| 2010/0282770 A1 | 11/2010 | Mendes et al. | |
| 2013/0226337 A1 | 8/2013 | Leech et al. | |
| 2019/0092617 A1 | 3/2019 | Brundick et al. | |
| 2020/0090114 A1 | 3/2020 | Conway | |
| 2020/0189836 A1 | 6/2020 | Sunesson et al. | |
| 2020/0193758 A1 | 6/2020 | Conway | |
| 2020/0257031 A1 | 8/2020 | Jung et al. | |
| 2021/0106147 A1 | 4/2021 | Sunesson et al. | |

FOREIGN PATENT DOCUMENTS

| | | | |
|---|---|---|---|
| EP | 3669707 | 6/2020 | |
| EP | 3669707 A1 * | 6/2020 | B65D 83/06 |

OTHER PUBLICATIONS

Purcell, Purcell's SmartBins Add-On System, https://www.youtube.com/watch?v=DI-tE25oOyY, uploaded Dec. 12, 2020 and accessed Jul. 4, 2023.

* cited by examiner

DETACHABLE HOPPER BULK DISPENSER

CROSS-REFERENCE TO RELATED APPLICATIONS

The present application claims priority of U.S. Provisional Patent Application No. 63/351,246, filed on Jun. 10, 2022 the contents of which is incorporated by reference herein in its entirety.

BACKGROUND

The present disclosure relates to the field of bulk dispensing bins, particularly those for use by consumers at point-of-sale installations. More specifically, the present disclosure relates to features for a dispenser with a detachable hopper.

Bulk dispensers, and more particularly gravity-feed bulk dispensers are known and used in commercial settings for self-service portioning of bulk materials, for example, foods. Traditionally, gravity feed bins for dispensing bulk materials are used to dispense a wide variety of materials having a range of sizes and aggregate make-ups as diverse as hardware components (e.g. nuts and bolts) or food (e.g. nuts, cereals, grains, pastas, coffee (beans or ground), dried soup mix, candies, spices). Generally, the bins include an enclosure having an inlet at an upper end through which the enclosure is filled and a dispenser having an outlet at a lower end for dispense of the material and having a flow control device located between the enclosure and the outlet for controlling the amount of materials being dispensed. In operation, as the material is being dispensed gravity pulls the remaining material in the enclosure towards the lower end to replace dispensed material. These types of bins generally include a downwardly curving inner wall that forms a chute to channel the dispensed materials in a receptacle adjacent the outlet. Typically, gravity feed bins use an integrated enclosure and dispenser. The enclosure is filled, and subsequently refilled, with the bulk material and the dispenser operated to dispense the bulk material. Periodically, the entire apparatus is taken out of operation for service and/or cleaning and may include subsequent use of the apparatus to dispense a different kind of bulk material.

Examples of known gravity feed bins are found in U.S. Pat. No. 4,903,866 entitled, "Gravity Dispensing Bin System"; U.S. Pat. No. 5,437,393, entitled, "Apparatus for Delivering Bulk Foods"; U.S. Pat. No. 6,182,864 entitled, "Bulk Food Dispensing Apparatus"; U.S. Pat. No. 6,241,123 entitled, "Bulk Food Dispensing Apparatus"; U.S. Pat. No. 7,178,697 entitled, "Agitator Assisted Bulk Product Dispenser"; U.S. Pat. No. 10,450,152 entitled, "Expandable Gravity-Feed Bin"; and US Pat. App. Pub. No. 2019/0092617 entitled, "Expandable Gravity-Feed Bin." Each of these are incorporated by reference in their entireties.

Solutions exist to automate or partially automate portions of the operation and interaction with a gravity feed bin. Applicant's pending U.S. patent application Ser. No. 17/694,001 entitled "Bulk Food Dispenser Automation"; PCT International Application No. PCT/US22/31306 entitled "Bulk Dispenser Actuation Detection"; and PCT International Application No. PCT/US22/31308 entitled "System and Method of Labeling and Weighing Goods" all disclose systems and features relevant to the dispensing of bulk goods, and are each incorporated by reference herein in their entireties.

BRIEF DISCLOSURE

An example of a gravity-feed dispensing system includes a hopper configured to hold a bulk material for dispense. The hopper includes an opening. A dispenser includes a valve operable between open and closed conditions to selectively permit bulk material to pass from the hopper through an outlet of the dispenser. The dispenser is configured to selectively connect the valve to the opening of the hopper.

In additional examples, the opening of the hopper is circular and the dispenser includes a barrel configured to selectively connect the dispenser to the opening of the hopper. An agitator is configured to translate within the hopper. The agitator includes a plurality of ribs extending across the agitator in a width dimension and a rib extending centrally along a length dimension. The agitator is flexible about the rib extending centrally along the length dimension. The valve includes a spool rotatably positioned within a valve housing. The spool includes a plurality of paddles extending between valve wheels, the valve wheels including a plurality of exteriorly extending ratchets.

The dispenser may further include a handle and a ratchet plate that connects the handle to the spool. The ratchet plate includes at least one pawl extending from at least one detent arm. The at least one pawl is configured to releasably engage the ratchets of the valve wheels. A false front compartment is connected to the dispenser. The false front compartment is open to the valve housing. The hopper includes a hopper identifier encoding an identification of the bulk material in the hopper. An agitator extends away from the valve and is configured to be received through the opening into the hopper. A handle is configured to operate the valve between the open and closed conditions. An actuator linkage mechanically connects the agitator to the handle. The actuator linkage includes an external rod exterior of a barrel of the dispenser and operably connected to the handle, an external crank connected to the external rod, an internal rod interior of the barrel of the dispenser and operably connected to the actuator, an internal crank connected to the internal rod. and a shaft connected between the external crank and the internal crank and extending through the barrel.

A gravity-feed dispenser for selective coupling to a hopper of bulk material includes a valve housing. A spool is within the valve housing. A handle is operatively connected to the spool to move the spool within the valve housing between open and closed conditions to selectively permit bulk material to pass through the dispenser housing.

Additional examples of a gravity-feed dispenser include the spool being selected from a plurality of interchangeable spools configured to be operatively positioned within the valve housing. At least one first spool of the plurality of interchangeable spools forms a rotary valve with the valve housing and at least one second spool of the plurality of interchangeable spool forms a flow metering valve with the valve housing. The first spool includes a plurality of paddles extending between valve wheels. The valve wheels include a plurality of exteriorly extending ratchets. The second spool includes a central passage defined between end walls and cylinder walls. The gravity-feed dispenser may include a handle and a ratchet plate that connects the handle to any spool of the plurality of interchangeable spools. The ratchet plate may include at least one detent arm, at least one pawl extending from the at least one detent arm, and a keyed projection. The at least one pawl is configured to releasably engage a ratchet of the first spool of the plurality of interchangeable spools comprising the ratchet. The keyed projection is configured to form a keyed connection with the second spool of the plurality of interchangeable spools. The second spool includes a keyed receptacle configured to receive the keyed projection of the ratchet plate to form the keyed connection.

In further examples of the gravity-feed dispenser, a false front compartment is selectively connected to the dispenser. An interior of the false front compartment is open to an interior of the valve housing. An agitator extends away from the valve and is configured to be received into a selectively connectable hopper. The agitator is configured with a rib to fold along a length dimension of the agitator.

DETAILED DISCLOSURE

Figure 1:
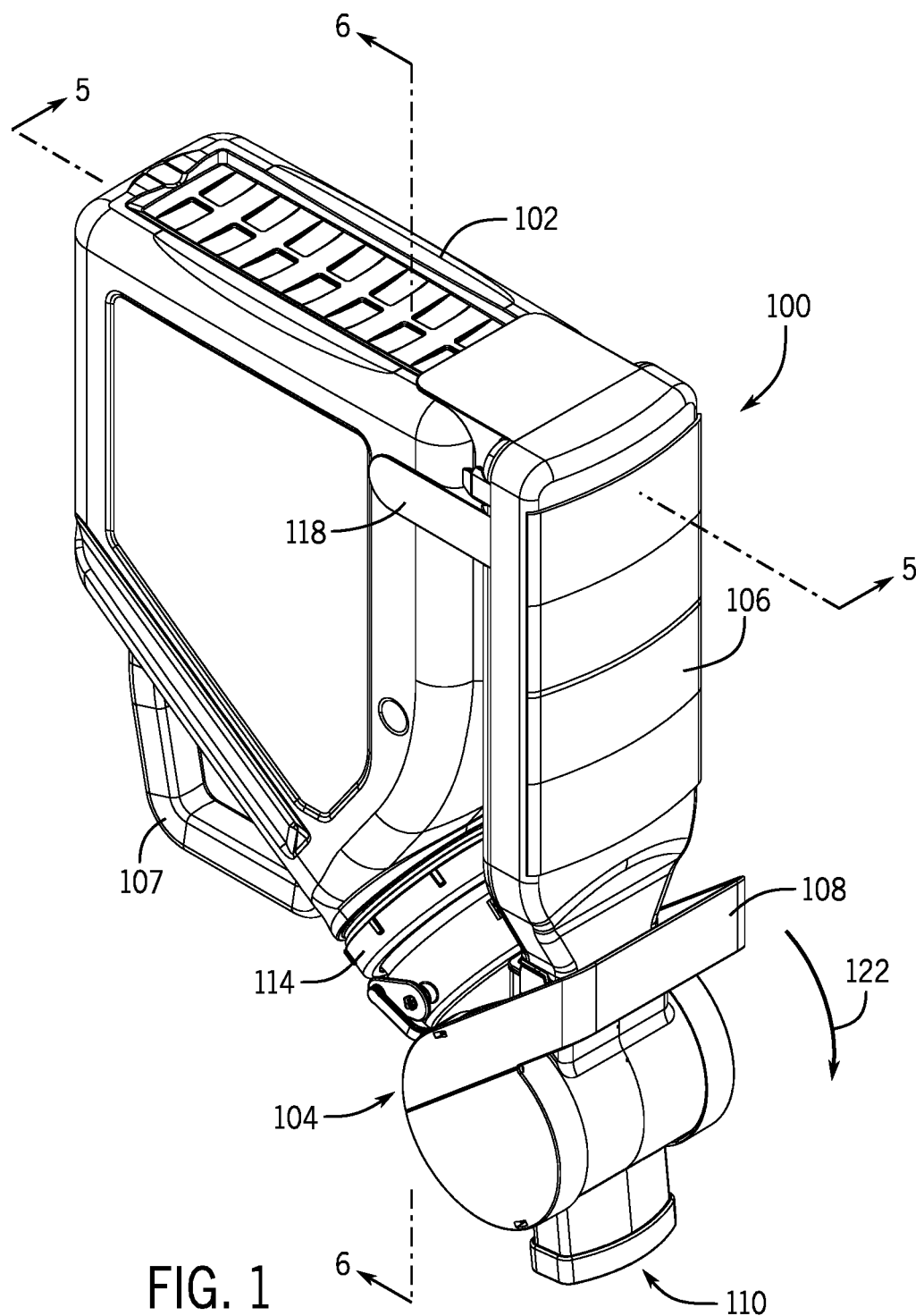
FIG. 1 is a front perspective view of an example of a gravity feed dispensing system.

Gravity feed bulk dispensing systems may use a detachable hopper as the enclosure to hold the bulk material to be dispensed. While it will be recognized that the bulk material may be any of a variety of forms of materials, the examples provided herein will be that of foodstuffs or other consumables. While the features as described herein may be used in connection with a gravity feed dispenser with an integrated enclosure, the examples provided herein will be with reference to a detachable hopper as the enclosure.

Gravity feed bulk dispensing systems with integrated enclosures and dispensers may use one or more components common to the construction of the enclosure and the dispenser. A gravity feed bulk dispensing system with separable dispenser and hopper use construction and design enabling such structures to be separable and interchangeable between individual dispensers and hoppers.

As used herein detachable hoppers are bulk goods containers that removably connect to a dispenser, the hopper holds the bulk material to be dispensed. Detachable hoppers may facilitate supply chain operations through the use of single-use constructions that are shipped to the retail location in a filled state and disposed of or recycled upon use. Detachable hoppers may further facilitate supply chain operations through the use of refillable constructions that are either refilled in place, like a current integrated enclosure, but are removable for separate cleaning and maintenance from the dispenser, or are returnable to a supplier of the bulk goods for cleaning, service, and refilling. Examples of detachable hoppers may include information technologies for example serial numbers, bar codes, RFID, NFC which encode identifying information representing the detachable hopper, the goods contained within the hopper, or attributes of the goods contained within the hopper.

The detachable hopper may be a disposable plastic liner bag, placed within a supporting structure (which may be another enclosure or hopper) and removed from therefrom once the bulk goods are dispensed, which can reduce or eliminate thorough cleaning of the supporting structure. A liner bag may be a component of a primary packing used to transport the goods from the distributor to the retailer or may be placed in the supporting structure before in-store filling of the liner bag.

The detachable hopper may be a recyclable or semi-disposable container in the form of a plastic or cardboard package which acts as the single-use primary packaging used to transport the goods from the distributor to the retailer, and which is a self-supporting structure for connection to the dispenser for retail use.

The detachable hopper may further be a reusable and refillable container. The construction of which may differ from the constructions above as the container is constructed for a multi-use and transport lifespan, requiring cleaning, sanitation, or contamination control. Such containers may be constructed of a variety of durable materials including plastic, glass, fabrics, natural or synthetic rubbers, or others as will be recognized within the scope of the present disclosure. A supply chain for the reusable and refillable containers may make use of a centralized cleaning or sanitation system, and/or filing system. Such systems may include specially designed or constructed facilities and/or machines and equipment.

The dispenser connects with the detachable hopper to form the gravity feed bulk dispensing system. The dispenser includes a valve and an outlet. The valve selectively occludes the hopper to control the start, stop, or other metering of the flow of the bulk product held within the hopper out of the outlet into a customer receptacle as part of a retail transaction.

The dispenser valve may exemplarily be a gate. However, it will be recognized that the valve may be embodied in a variety of other components, any of which are within the scope of the present disclosure. The valve controls the ejection of the bulk product at a rate that is suitable for delivery to the customer. The valve is configured to do so with minimal lag time between starting and stopping the bulk product dispense and with minimal leakage of the bulk material when the valve is in the closed position. The valve generally may operate according to one of two different valve configurations: a fixed displacement valve or a flow metering valve. In examples, valves of either of these two configurations may include the same or similar components, yet arranged to operate in one of these configurations.

In a fixed displacement valve system, a chamber of a defined volume is alternatively opened and closed such that a constant fixed volume of material is sequentially trapped/portioned and then released with each successive operation of the valve. Each fixed displacement valve system segregates a portion of the bulk material from the stored material as a whole and dispenses sequential increments of these segregated portions. These sequential increments of portions may be used to estimate and/or monitor the amount of the bulk material that has been dispensed. The valve system may be designed to repeatably produce a portion of a known volume. Fixed displacement systems may include any of a variety of mechanical systems.

A bi-gate system includes an input gate and an output gate defining a chamber there-between. First, the input gate is opened while the output gate remains closed until the chamber is filled to the desired measured level. This level may be defined by the volume of the chamber in which the chamber is configured to fill to a particular volume. Secondly, the input gate is closed while the output gate is opened, to evacuate the chamber and dispense the portioned product. In examples, the input gate and the output gates may be separate gating structures, or in other examples, the input gate and the output gates may be portions of a single gating structure.

A combined gate system incorporates the input gate and the output gate, as described above, into a single moving part. Such a system functions the same as the bi-gate system as described above, except the two gates are moved as a pair in a single motion under the same actuation. In some examples of such a system, both gates may both momentarily exist in a transitional state, wherein both gates are partially open, however, the geometry of the system is such that no significant leakage past both the input gate and the output gate during a single movement occurs.

A rotary gate system operates functions similarly to the bi-gate and combined gate systems as described above, however, the gate system revolves to position between open and closed positions of the input gate and the output gate. This is exemplarily contrasted with a reciprocal pivot as may be used to move the bi-gate or the combined gate as described above.

A screw system may use a rotary motion of a screw to draw bulk material axially along the length of the screw, pushed by the flight or flights of the screw. The spacing between the flight(s) define individually trapped volumes which are dispensed with reach rotation of the screw.

In a flow metering valve system, the valve is positioned between the container or compartment holding the bulk material and the outlet of the dispenser. The valve defines an orifice with a controllable area through which the bulk material can flow to the outlet. The open area of the valve controls the rate at which the bulk material flows to the outlet. The valve can be movable between open and closed positions or may be continuously adjusted between fully open and fully closed positions. Flow metering valve systems may exemplarily be used to compute volume and mass from a calibration-based and/or formula-based flow rate and duration calculation. The flow rate may be derived from a determination of the orifice area size (which may be determined based upon a detected or known position of the valve). A known or measured upstream pressure, weight, or volume of bulk material above the valve is used along with the orifice area size to determine the flow rate. A calibration technique and/or model equations and/or experimentally derived lookup tables for various bulk materials and/or conditions may be used to calculate the flow rate. Measurement of the volume or mass of the bulk material held within the dispenser may be further used in adjustment factors or formula variables in further calculations of the bulk material flow rate.

Flow metering valve systems may be implemented with any of a variety of structures, including with the examples provided herein. Gate valves may include a plate or door which is moved (e.g. raised or lowered) transverse to the outlet. A ball valve may be a cylindrical, elliptical, or spherical element with a cutout in the valve body, which as the valve body rotates within a valve housing, the orifice area through the valve is changed. A butterfly valve includes a plate of arbitrary shape that may be rotated via a shaft such that the plate is positioned into more axial alignment with the outlet (open) or more transverse across the outlet (closed). An iris valve includes a plurality of plates that are connected to move in a coordinated fashion to radially change the open cross-sectional area of the orifice.

The examples provided herein will exemplarily use a rotary gate valve, unless otherwise discussed, however, it will be recognized that the features and structures as described herein may be adapted to and used with any of a variety of the valves noted above.

FIG. 1 is a perspective view of an example of a gravity feed dispensing system 100. The system 100 includes a hopper 102 that is releasably connected to a dispenser 104. A false front compartment 106 as described in further detail herein may exemplarily be operatively connected to the dispenser 104. The dispenser 104 includes a handle 108 and an outlet 110 exemplarily taking the form of a spout. The handle 108 receives a manual force input from a customer to operate a valve internal to the dispenser 104 to selectively permit bulk material to pass from the hopper 102 through the dispenser 104 and out of the outlet 110. As previously noted, in the example presented herein, the valve is a rotary valve, although other forms of valves as discussed above may be used, including, but not limited to reciprocating gate or screw valves.

In examples, the hopper 102 may include a handle 107 to facilitate transport, delivery, loading, or removal of the hopper 102. In other examples, the handle 107 may simultaneously be or may alternatively be a support configured to engage a shelf or installation at the retail setting to help to support the gravity feed dispensing system 100 partially or in full.

Figure 2:
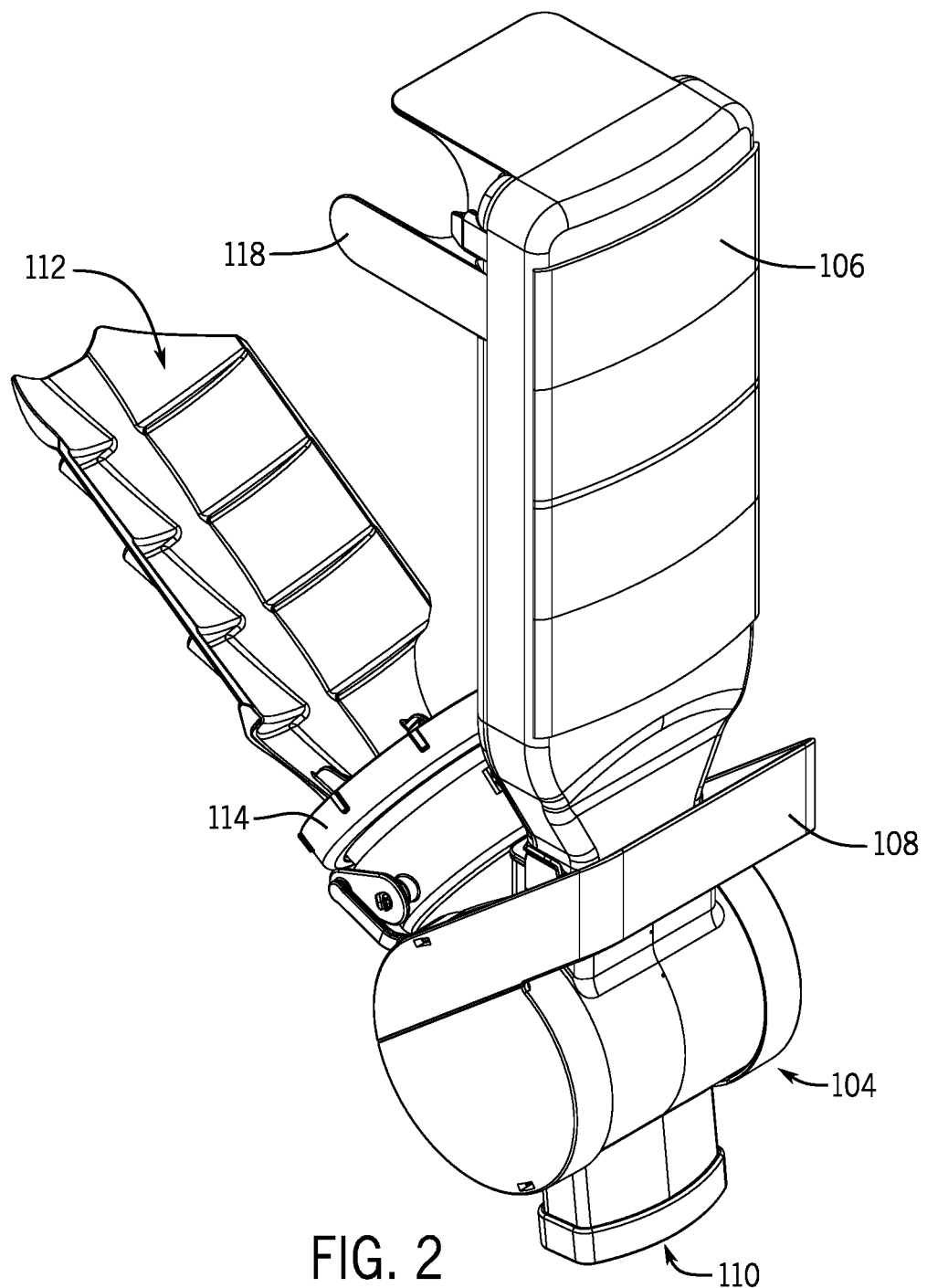
FIG. 2 is a front perspective view of an example of the dispenser and the false front compartment.
Figure 3:
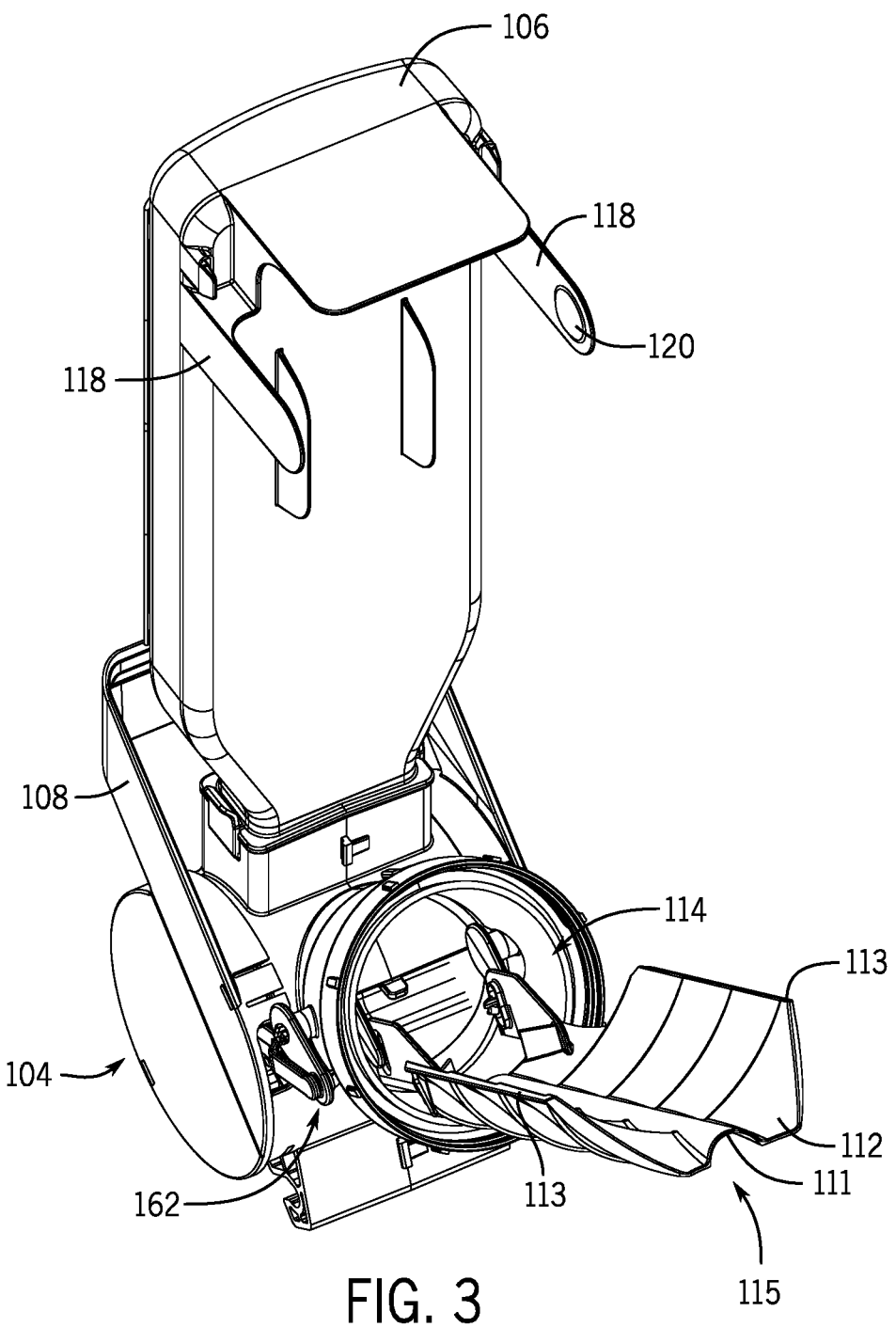
FIG. 3 is a top rear perspective view of the dispenser and the false front compartment.

FIG. 2 is a front perspective view of an example of the dispenser 104 and the false front compartment 106. FIG. 3 is a top rear perspective view of the dispenser 104 and the false front compartment 106. The dispenser 104 may further include an agitator 112. The agitator 112 may include features disclosed in U.S. Pat. No. 7,178,697, incorporated by reference above, and are generally used in the dispense of some bulk goods to loosen the product and communicate it towards the valve of the dispenser. While some bulk goods may be relatively free-flowing and not require an agitator, particularly soft or sticky bulk goods (e.g. dried fruits or gummy bears) or finely ground bulk goods (e.g. wheat, almond, or coconut flours) may require agitation for consumer retail bulk dispensing.

The dispenser 104 includes a barrel 114 which exemplarily includes threads, ribs, or other friction-fitting features which facilitate the connection of the dispenser 104 to a mouth 105 of the hopper 102. The mouth 105 may have an inside diameter that is less than a corresponding interior width dimension of the hopper 102. The agitator may also have a width similar to that of the interior width of the hopper. The agitator 112 is exemplarily constructed with a flexible rib 111 extending centrally along a length of the agitator 112. The rib 111 is exemplarily constructed as an arch or semi-circle, although other constructions, including, but not limited to rectangular, angular, or accordion-shaped rib(s) may be used. The rib 111 biases the agitator 112 into the operable position as shown in FIGS. 2 and 3. The rib 111 also permits temporary deformation along the length axis upon which the rib 111 is centered to fold the sides 113 of the agitator 112 towards one another to temporarily reduce the width dimension of the agitator 112 to enable the agitator 112 to fit through the fixed interior diameter of the mouth 105 of the hopper 102.

Figure 4:
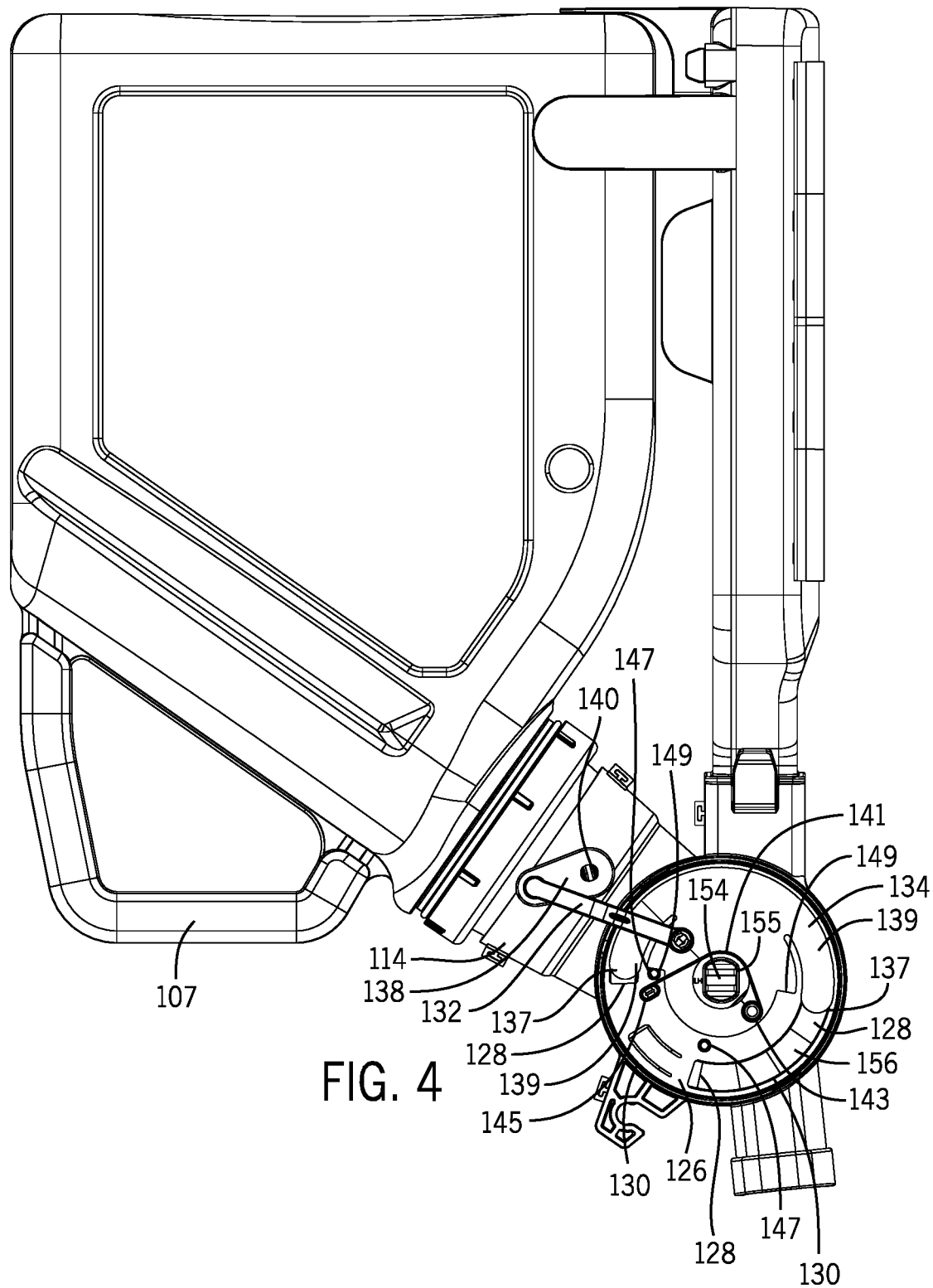
FIG. 4 is a side view of the gravity feed dispensing system with the handle removed.
Figure 5:
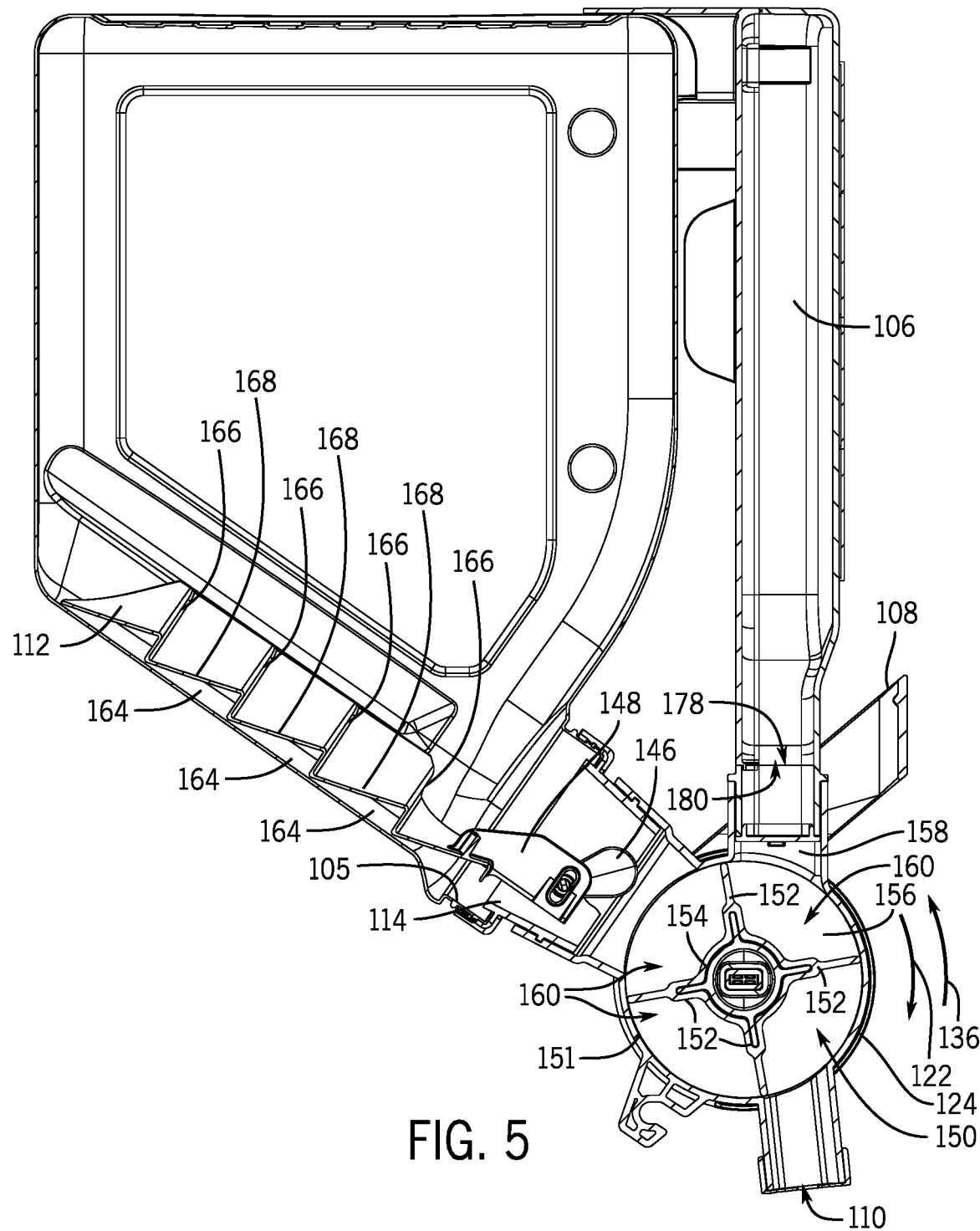
FIG. 5 is a side sectional view of the gravity feed dispensing system as taken along line 5-5 in FIG. 1.

FIG. 4 depicts the dispensing system 100 with the handle 108 removed to better depict portions of the valve 150. FIG. 5 is a side sectional view of the gravity feed dispensing system as taken along line 5-5 in FIG. 1. As seen in FIG. 5, the valve 150 is a rotary valve in the form of a paddle wheel. The valve 150 exemplarily includes a spool 151 with four paddles 152 extending radially away from a shaft 154. It will be recognized that various other numbers of paddles may be used in examples, including two, three, five, or more. The shaft 154 and the paddles 152 extend between valve wheels 156 forming the ends of the valve 150. The spool 151 rotates within a valve housing 124 of the dispenser 104. The valve housing 124 is open to the barrel 114, the outlet 110, and to a false front shaft 158.

The handle 108 exemplarily imparts a rotational force on the valve 150 as an operator moves the handle in the direction of arrow 122. The handle 108 fits within a keyed connection 155 of a ratchet plate 134. The ratchet plate 134 is connected to the shaft 154 of the valve 150. Rotation of the handle 108 in the direction of arrow 122 thus rotates the shaft 154 of the valve 150. Each valve wheel 156 includes ratchets 128 extending outwards towards the handle 108. The ratchets 128 are exposed through ratchet apertures 130 through a wall 126 of the valve housing 124. The ratchet plate 134 includes pawls 137 at the ends of detent arms 139. The pawls 137 extend from the detent arms 139 in the direction of the valve wheel 156. The pawls 137 of the ratchet plate 134 and the ratchets 128 of the valve wheel 156 engage to translate force from the handle 108 in the direction of arrow 122 into rotation of the valve wheel 156 in the direction of the arrow 122.

An elastic band 141 is strung between projection 143 on the ratchet plate 134 and projection 145 on the wall 126 of the valve housing 124. The wall 126 of the valve housing 124 further includes stop projections 147 which are positioned to engage stop surfaces 149 on the ratchet plate 134. Engagement between the stop surfaces 149 and the stop projections 147 respectively define the extent of the rotation of the system, including the ratchet plate 134 and the handle 108. In an example as discussed further below, this rotation may be through an arc of 90 degrees. The elastic band 141 provides a biasing force on the ratchet plate 134 to bias the ratchet plate 134 and the handle 108 in the closed position or otherwise in the direction of arrow 136. The pawls 137 of the ratchet plate 134 and the ratchets 128 of the valve wheel 156 are angled to disengage and slide past one another upon motion of the handle 108 in the direction of arrow 136, for example under the biasing force of the elastic band 141, to return the handle 108 to the position shown in FIG. 1. This selective disengagement converts the reciprocating movement of the handle to rotary movement of the valve 150. As a compartment 160 defined between two adjacent paddles 152 aligns with the barrel 114, and bulk material from the hopper fills the compartment 160 by a gravity feed. Further rotation of the valve 150 in the direction of arrow 122 rotates the compartment about the axis of the shaft 154 until the compartment 160 is in alignment with the outlet 110 and dispenses the portion of the bulk material from the compartment 160 through the outlet 110. It will be recognized that a retail dispense of the bulk material may include multiple actuations of the handle 108 and the subsequent dispense of multiple compartments 160 filled with bulk material.

In examples, valve 150 operates in a single direction (arrow 122). Relatedly, in a further example, the valve 150 may be a screw configuration that rotates axially in a single direction. Description has been provided herein where a ratcheting connection between the handle and the valve turns reciprocal motion of the handle 108 into rotational motion of the valve 150. In examples, the manual handle 108 may be operationally replaced with a motorized operation while substantially retaining the structure and function as described herein. Motorized or automated operation of the dispenser may include features or functions as described in previously noted U.S. patent application Ser. No. 17/694,001 and PCT International Application No. PCT/US22/31308.

The arrangement of the dispenser 104 as provided above, further facilitates improved operation and function of the agitator 112. As depicted in FIG. 4, an external rod 132 is pivotably connected to the ratchet plate 134. The ratchet plate moves with the reciprocation of the handle 108, resulting in reciprocating movement of the external rod 132. The external rod 132 is pivotally connected to an external crank 138 at an end of the external rod 132 opposite from the end of the external rod 132 pivotally connected to the ratchet plate 134. The external crank 138 is connected to a shaft 140 that extends through a through-hole 142 in the barrel 114 of the dispenser 104.

Figure 6:
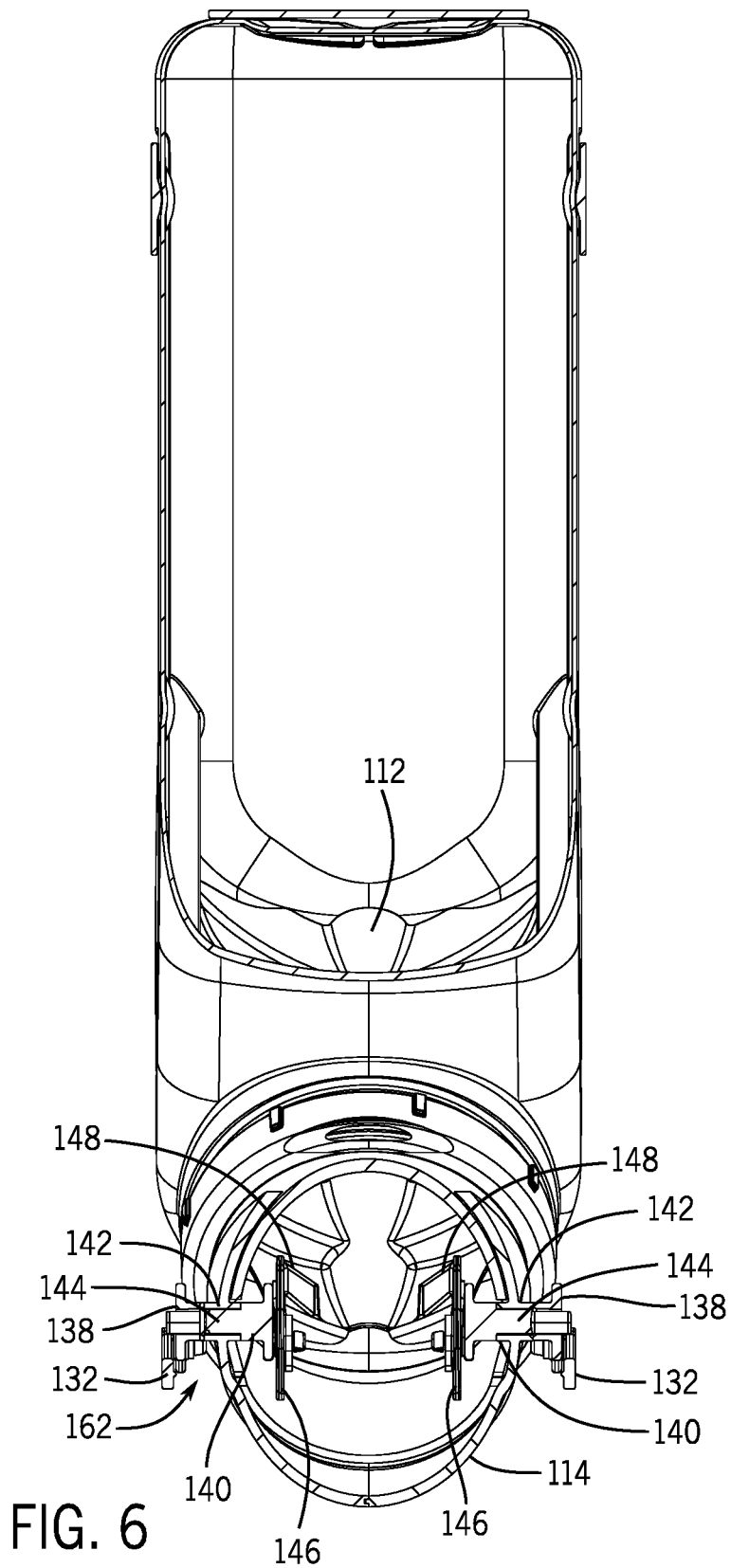
FIG. 6 is a front sectional view of the gravity feed dispensing system as taken along line 6-6 in FIG. 1.

FIG. 6 is a front sectional view of the gravity feed dispensing system as taken along line 6-6 in FIG. 1. The sectional views of FIGS. 5 and 6 show the internal components of the dispenser 104. FIG. 6 further depicts the shaft 140 and the through-hole 142 through the side of the barrel 114. FIG. 6 shows symmetrical components extending from each side of the handle 108 and thus depictions and descriptions made with reference to one side or view regarding these components are recognized to apply to or disclose similar components on the other lateral side of the dispenser 104. A seal 144, which may be a rubber gasket may further be positioned between the shaft 140 and the barrel 114 at the through-hole 142, while it will be recognized that in other examples, the through-hole and the shaft 140 may be dimensioned such that a suitable seal exists without an additional seal component. It will be recognized that the connection of the shaft 140 through the wall of the barrel 114 is such that bulk goods within the barrel 114 and the dispenser 104 do not leak out of the barrel 114 at this location.

Internal to the barrel 114, an internal crank 146 is connected to the shaft 140, and an internal rod connected to the internal crank 146. The internal crank 146 is pivotally connected to the agitator 112. The agitator linkage 162 as described herein, e.g. the external rod 132, the external crank 138, the shaft 140, the internal crank 146, and the internal rod 148 operate to transfer the rotating reciprocal motion of the handle 108 into translative reciprocal motion of the agitator 112 by way of rotative motion of the external crank 138 and the internal crank 146. The agitator linkage 162 decouples the direct actuation of the valve 150 (by actuation of the handle 108) from the actuation of the agitator 112. In some dispensing operations, it has been discovered to be advantageous to provide multiple agitation cycles per cycle of actuation of the valve 150. The agitator 112 exemplarily includes a plurality of ribs 164 that define a plurality of faces 166 and a plurality of surfaces 168. As the agitator 112 translates, movement of the agitator 112 towards the valve 150 pushes the bulk goods into the barrel 114 and towards the valve 150 with the faces 166. As the agitator 112, further translates, movement of the agitator 112 away from the valve 150 slides the agitator 112 below the bulk goods along the surfaces 168, breaking up any bridging of the bulk goods. In the example shown, the handle 108 moves in the direction of arrow 122 through an angle of approximately 90 degrees. The agitator linkage 162 may operate to move the agitator 112 at a 1:1 ratio with movement of the handle 108. That is, as the handle 108 is exemplarily rotated in downwards in the direction of arrow 122, the agitator 112 is drawn forwards towards the valve 150, while when the handle 108 returns in the direction of arrow 136, the agitator 112 is returned to its prior position. The agitator linkage 162 may be configured to provide a movement ratio greater than 1:1 between the handle and the agitator. The agitator linkage 162 may to translate the agitator exemplarily for every 45 degrees of movement of the handle 108. Therefore, in the configuration shown, each full downward cycle of the handle 108 moves the agitator forward and back, improving effectiveness of the agitator 112, for a movement ratio of 2:1. While the specific examples of 90 degrees and 45 degrees are presented in this example, it will be recognized that other movements or ratios may be similarly used. In another example, the handle moves through 120 degrees of rotation, and the agitator linkage is configured to complete a cycle through 60 degrees of rotation. In a still further examples, the handle may moves through any range of rotation for example, between 90 and 150 degrees. The agitator linkage may be configured with a movement ratio of 3:1. Other configurations and movement ratios will be recognized based upon this disclosure and are considered to be part of the present disclosure.

In an additional example, because a spacing exists between the ratchets 128 of the valve wheel 156, the handle 108 may be moved back and forth within a small angle of rotation, keeping the pawls 137 of the ratchet plate 134 between the adjacent ratchets 128 of the valve wheel 156, thereby generating some movement of the agitator 112 without engagement, movement, or leakage of material from the valve 150.

As previously noted, in a further example, a motor may replace the handle 108. Using a geared drive, the ratio of the agitator may be selectively set to some multiple of the rotations of the motor required for a dispense. In an example, the agitator linkage 162, or another configuration thereof, may be connected to the primary gear on the motor, with the valve being operated by a secondary gear on the motor, or by using an intermediate gear member from which the agitator linkage 162 is driven.

Figure 8:
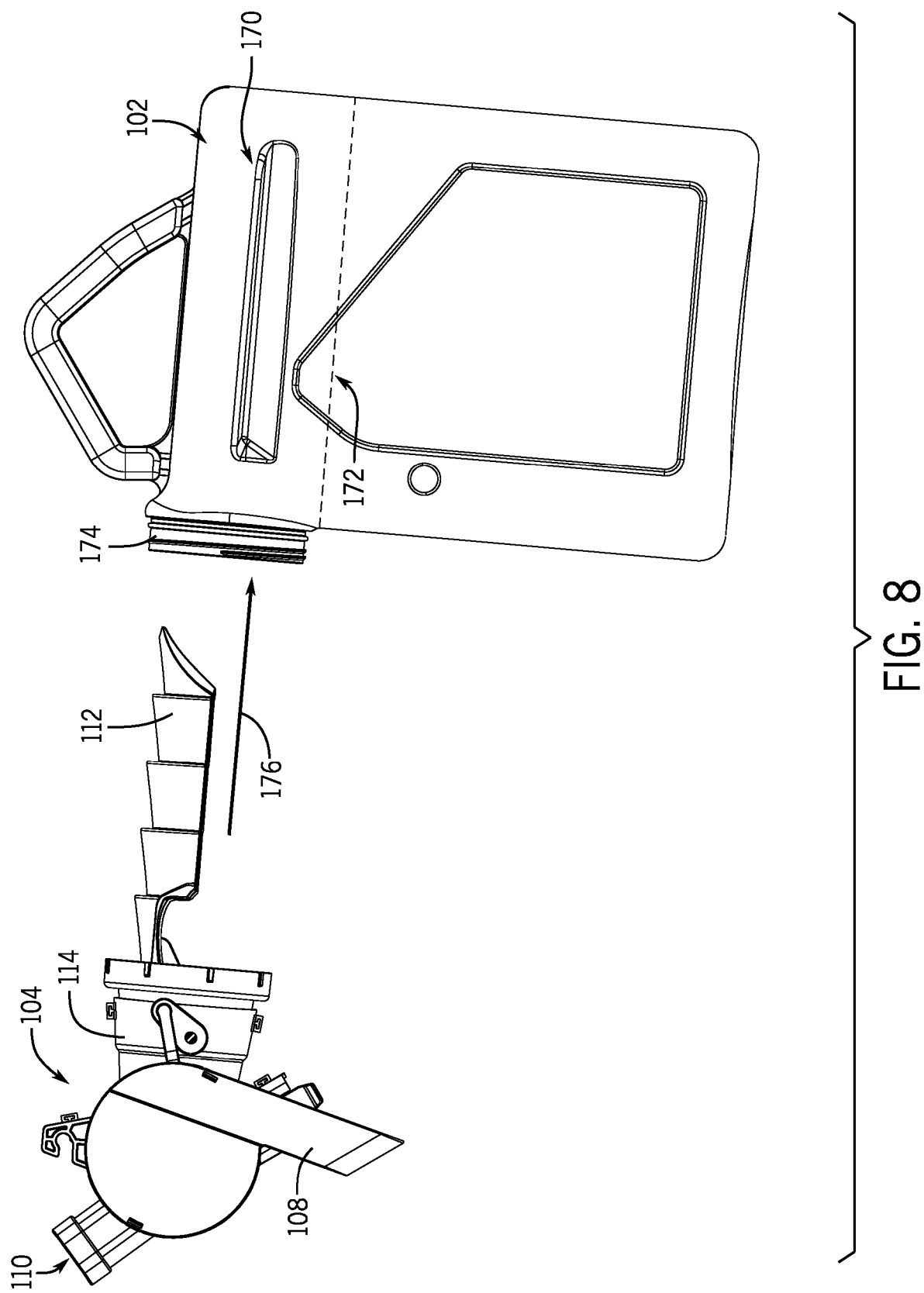
FIG. 8 depicts an example of connecting a dispenser to a configuration of a hopper.

In an example, the dispenser 104 and the agitator 112 may be connectable to a filled detachable hopper 102. In current gravity feed bulk dispensing systems, the agitation element is positioned at the bottom of the enclosure, and the bulk goods are filled in on top of the agitator 112. With reference to FIG. 8, the detachable hopper 102 may be inverted for connection to the dispenser 104. With the detachable hopper 102 inverted, a headspace 170, represented by fill line 172 surrounds the opening 174 of the detachable hopper 102. With the hopper 102 in this orientation and the headspace 170 in alignment with the opening 174, the dispenser 104 can be connected to the hopper 102 in the direction of arrow 176, positioning the agitator 112 below the bulk goods in the hopper 102 when the hopper 102 is returned to the operational orientation. The barrel 114 of the dispenser 104 connects to the opening 174 of the hopper 102, for example by screw type, bayonet type, ribbed type, or other interference friction fit.

Figure 9:
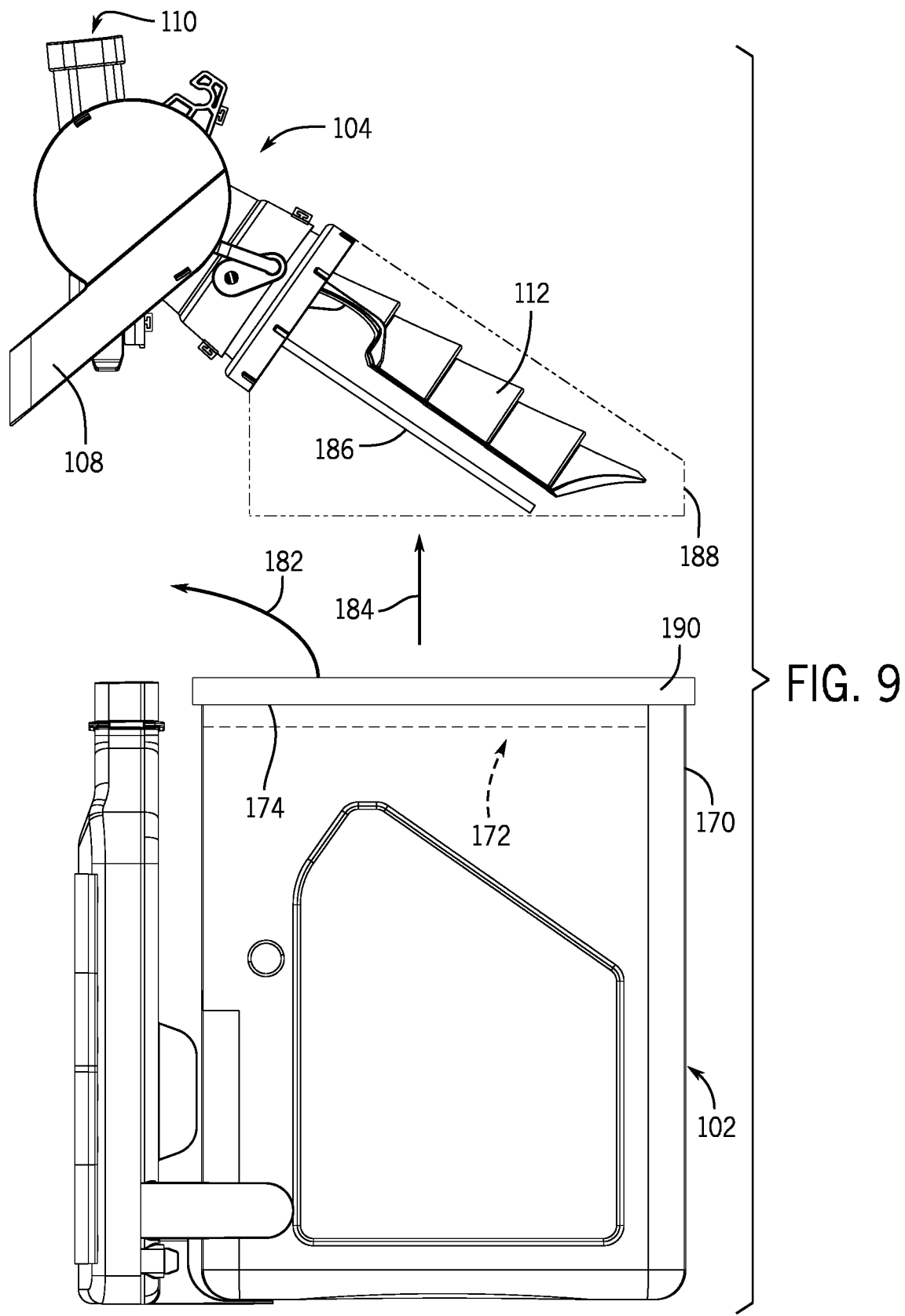
FIG. 9 depicts a further example of connecting a dispenser to a configuration of a hopper.

FIG. 9 provides a further example of a configuration of a hopper 102 and a dispenser 104. The hopper 102 and the dispenser 104 are depicted in an inverted condition for connection of a hopper 102 full of bulk goods to the dispenser 104. The dispenser 104 includes an extended barrel 188 that surrounds the agitator 112. The extended barrel 188 is configured to attach to the opening of the hopper 102. The extended barrel 188 may further include other physical connections like latches or detent tabs or seals to connect to the hopper 102. The extended barrel 188 includes an angled floor, which may exemplarily be an angle between 30-45 degrees. One or more agitator retention ribs 186, which the agitator 112 slides below and keep the agitator 112 from floating upwards into the bulk material during operation. It will be recognized that the one or more agitator retention ribs 186 may be located elsewhere or in other structures, while still being able to perform the function described herein.

The hopper 102, in this example, has minimal headspace 170 between the fill line 172 and the opening 174. The opening 174 extends across the entire side of the hopper 102, and a lid 190 selectively occludes the opening 174. In use, for loading the dispenser 104, the dispenser 104 and the hopper 102 are inverted. The lid 190 is removed as represented by arrow 182 and the hopper 102 and the dispenser 104 are moved relatively together as represented by arrow 184.

Examples of the gravity feed dispensing system further include a false front compartment 106. The false front compartment is exemplarily transparent and physically connected to the dispenser 104. In additional examples, the false front compartment 106 may further include resilient tabs 118 and/or detent buttons 120 configured to releasably connect the false front compartment 106 to the hopper 102. In examples, the hopper 102 may be an opaque, obscured, or otherwise unsuited for customer-facing visual presentation of the bulk good contents of the hopper 102. The false front compartment 106 serves to visually present the actual or representative bulk goods contained within the hopper 102. In examples, a portion of the bulk goods content of the hopper 102 is transferred to the false front compartment 106 for display. The false front compartment 106 may further include features or functions as described herein.

With reference to the sectional view of FIG. 5, the false front compartment 106 may be releasably secured, for example by friction or interference fit, to the valve housing 124 of the dispenser 104. It will be recognized that the false front compartment 106 may connect to the dispenser 104 at another location or manner than that shown in FIG. 5. In an example, the false front compartment 106 is connected to the valve housing 124 at the false front shaft 158. The false front shaft 158 is open through the valve housing 124 to the valve 150. The false front compartment 106 exemplarily defines a volume and is open or selectively open at an opening 178 at a lower end of the false front compartment 106. The false front compartment 106 may be filled with the bulk goods from the hopper 102 and connected to the dispenser 104. Such connection may also occur while the hopper 102 is being connected to the dispenser 104, for example, as described above with respect to FIG. 8. Upon inversion of the false front compartment 106 to the dispensing orientation, gravity pulls down on the bulk goods within the false front compartment 106. While the hopper 102 is full or relatively full of bulk goods, the dispenser will fill each compartment 160 of the valve with bulk goods for dispense. This full compartment 160, when rotated past the false front shaft 158 blocks any of the bulk goods in the false front compartment 106 from further filling the compartment 160 of the valve. However, as the volume of bulk goods in the hopper 102 decreases, each compartment 160 may not fill completely, and when a partially filled compartment 160 is in alignment with the false front shaft 158, bulk goods from the false front compartment 106 flow by gravity feed to top off the compartment 160. This reduces the observed volume of bulk goods in the false front compartment 106 and provides a visual indication of the approximate fill level of bulk goods in the opaque or otherwise obscured hopper 102.

In an example, a selectively operable door 180 which may be located in the false front shaft 158 or may be a part of the false front compartment 106 may be operable to occlude the bulk goods from exiting the false front compartment 106. In such example, the false front compartment 106 may contain a merchandisable bulk goods for visual presentation to the customer, but not dispense along with the bulk goods of the hopper and therefore not present a visual indication of the fill level of the hopper 102. In a further variation, the door 180 may be selectively operable or may be openable during operation such as to provide resistance to the bulk goods in the false front compartment 106, but permit bulk goods to pass from the false front compartment 106 for dispense.

In a still further example, because the false front compartment 106 is detachable from the dispenser 104 and the hopper 102, the false front compartment 106 may rather include print or electronic display advertising. The independent structure of the false front compartment 106 provides an efficient manner for reconfiguring or replacing print display advertising of the contents, price, photographs, or other advertising of the bulk good dispensed by the dispenser. The independence of the false front compartment 106 may further facilitate electronic or interactive display systems, for example, as described in previously noted U.S. patent application Ser. No. 17/694,001 and PCT International Application No. PCT/US22/31308. The independence of the false front compartment 106 from the dispenser 104 and the hopper 102 may facilitate disconnection of electronics (held within the false front compartment 106) from the dispenser 104 for dispenser maintenance or cleaning.

Figure 10:
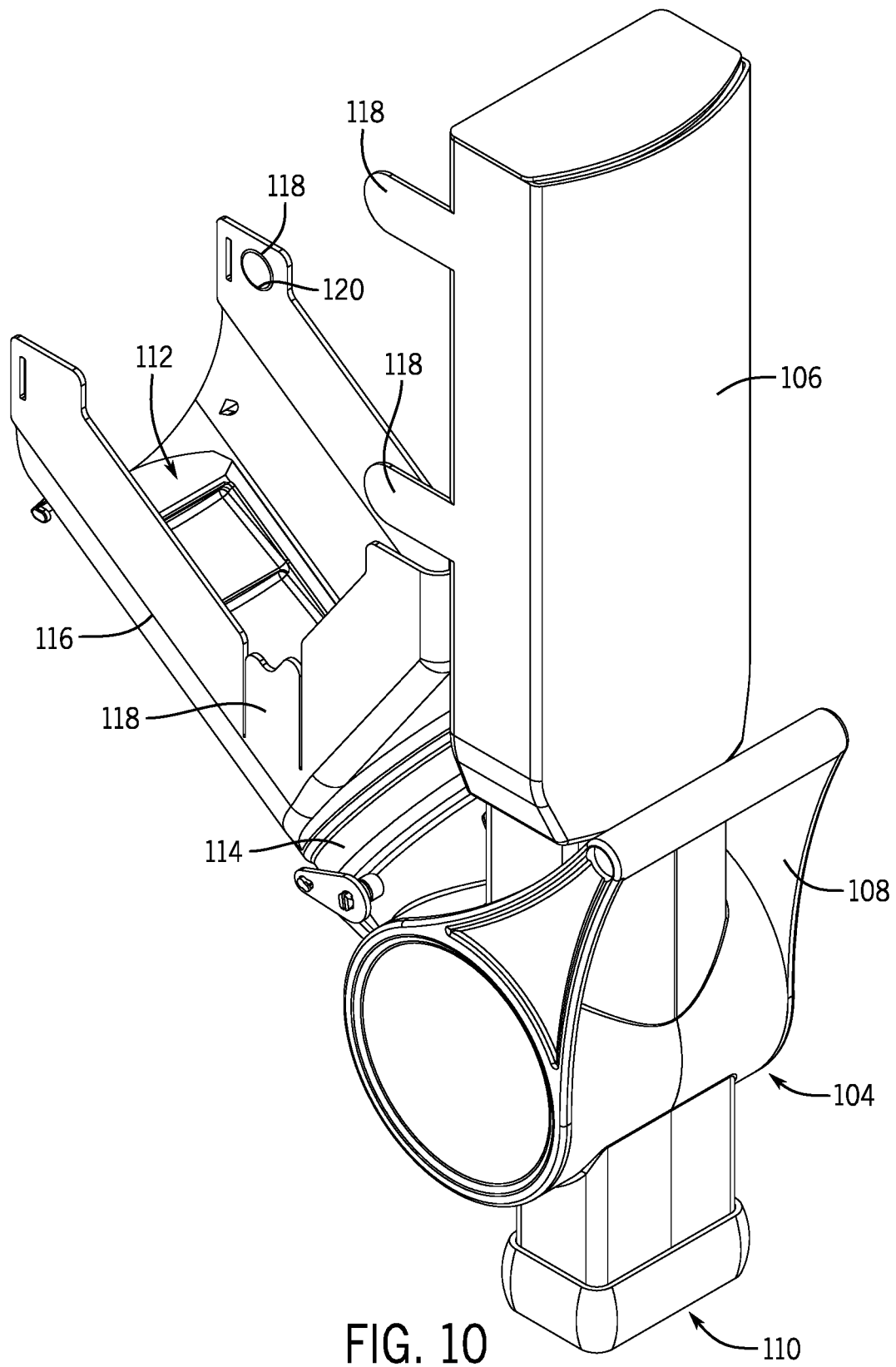
FIG. 10 depicts another example of connecting a dispenser to a configuration of a hopper.

FIG. 10 depicts an additional example of a dispenser 104 with a cradle 116 that extends rearward from the barrel 114 and is configured to connect to and provide additional support to the hopper, for example as depicted above. The cradle 116 and the barrel 114 may extend at an exemplary angle between 30-45 degrees although other ranges may be recognized. The angle may be with reference to a horizontal dimension when the gravity feed dispensing system is in a dispensing position. The horizontal dimension may be perpendicular to a vertical dimension represented by either the outlet 110 or the false front compartment 106. Relatedly, the opening of the barrel 114 may be perpendicular to the cradle 116, exemplarily at an angle between degrees, depending on the angle of the barrel 114 and the cradle 116. The cradle 116 may further include a slot or aperture which may be dimensioned to receive an external handle of a hopper 102 therethrough. The cradle 116 may include resilient tabs 118 forming a detent connection, exemplarily with a button 120 or other projection to secure them to the hopper 102.

Figure 11A:
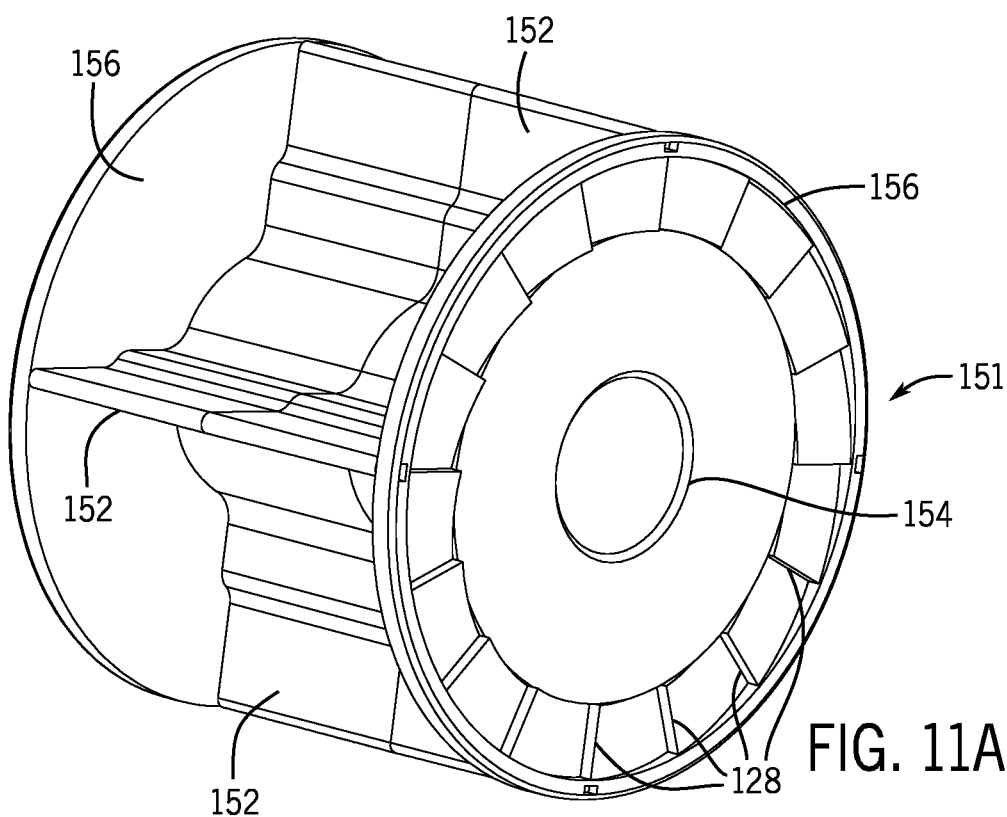
FIG. 11A is a detailed view of an example of an interchangeable spool for use in the dispensing system.

FIG. 11A presents a detailed view of the spool 151, as described above, which fits within the valve housing to form the valve 150 in an example of a fixed displacement rotary valve. FIG. 11A also shows the ratchets 128 in the exterior of the valve wheel 156 and the hollow shaft 154 through the spool. As described above, the pawls on the ratchet plate 134 engage and disengage with the ratchets 128 to drive the spool 151 forward to sequentially dispense the volume of the compartments 160 defined between the paddles 152 filled with the bulk material. Each dispense incrementally dispenses the fixed volume of the compartment 160. In a further aspect of the dispensing system 100 as disclosed herein, the spool 151 is interchangeable with alternative spool designs to provide an alternative type of valve.

Figure 7:
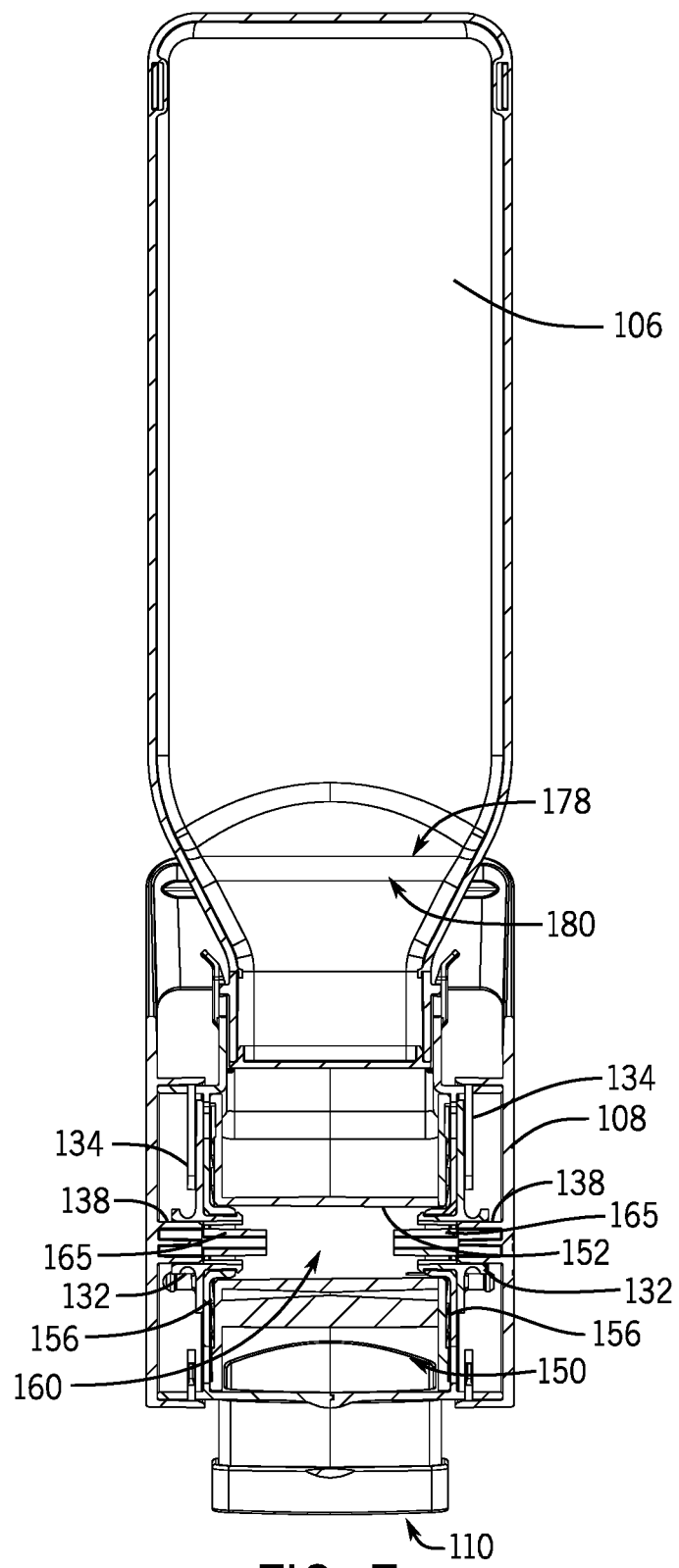
FIG. 7 is a front sectional view of the gravity feed dispensing system as taken along line 7-7 of FIG. 1.
Figure 11B:
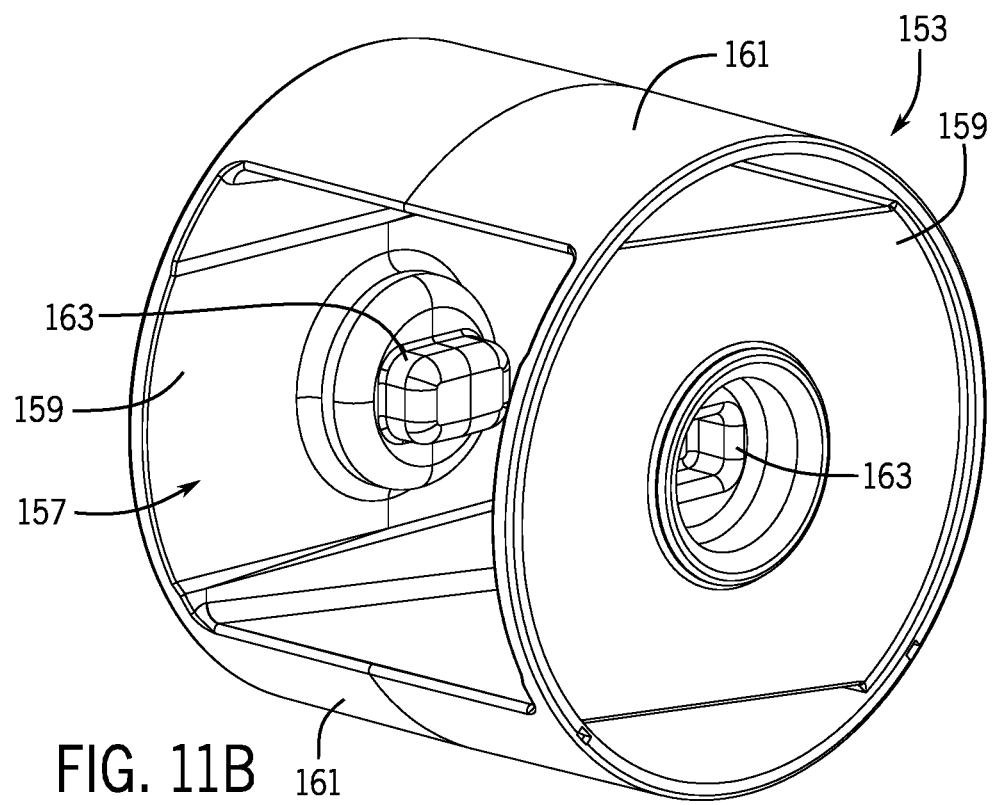
FIG. 11B is a detailed view of an example of an interchangeable spool for use in the dispensing system.

FIG. 11B depicts a spool 153 which can interchange with spool 151 and operate in conjunction with the dispensing system 100 as depicted and described above with respect to FIGS. 1-10. The spool 153 fits within the valve housing 124 to form a valve 150 in an example of a flow metering valve. The spool 153 defines a central passage 157 between end walls 159 and cylinder walls 161. The end walls 159 include keyed receptacle 163 that receives the corresponding keyed projection 165 of the ratchet plate 134 (FIG. 7) to form a keyed connection. The end walls 159 do not include ratchets as in the spool 151, rather the keyed connection between the ratchet plate 134 and the end walls 159 of the spool 153 transfer the rotation of the handle 108 to the spool 153. The spool 153 thus rotates in correspondence to the movement of the handle 108, reciprocating with the handle (e.g. arrows 122 and 136 described above). When the handle 108 is pulled down in the direction of arrow 122, the central passage 157 aligns between the barrel 114 and the outlet 110 of the dispenser 104. This opens a free flow of the bulk material out of the hopper 102 until the handle 108 is rotated back in the direction of arrow 136 and the spool 153 rotates within the valve housing until the central passage 157 is out of alignment with the outlet 110, occluding the flow of bulk material.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives, and modifications are possible within the scope of the appended claims.

This written description uses examples to disclose the invention, including the best mode, and also to enable any person skilled in the art to make and use the invention. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A gravity-feed dispensing system comprising:
    a hopper configured to hold a bulk material for dispense, the hopper comprising a mouth; and
    a dispenser comprising a valve operable between open and closed conditions to selectively permit bulk material to pass from the hopper through an outlet of the dispenser; wherein the dispenser is configured to selectively connect the valve to the mouth of the hopper wherein the dispenser comprises:
    a valve housing;
    a spool rotatably positioned within the valve housing, the spool comprising a plurality of paddles extending between valve wheels comprising a plurality of exteriorly extending ratchets;
    a handle; and
    a ratchet plate that connects the handle to the spool, wherein the ratchet plate comprises at least one pawl extending from at least one detent arm, the at least one pawl configured to releasably engage the ratchets.

2. The gravity-feed dispensing system of claim 1, wherein the mouth of the hopper is circular and the dispenser comprises a barrel configured to selectively connect the dispenser to the mouth of the hopper.

3. The gravity-feed dispensing system of claim 1, wherein the hopper comprises a hopper identifier, the hopper identifier encoding an identification of the bulk material in the hopper.

4. The gravity-feed dispensing system of claim 1, wherein the dispenser comprises an agitator that extends away from the valve and is configured to be received through the mouth into the hopper.

5. A gravity-feed dispenser for selective coupling to a hopper of bulk material, the gravity-feed dispenser comprises:
a valve housing;
a spool within the valve housing; and
a handle operatively connected to the spool to move the spool within the valve housing between open and closed conditions to selectively permit bulk material to pass through the dispenser housing;
wherein the spool is selected from a plurality of interchangeable spools configured to be operatively positioned within the valve housing and at least one first spool of the plurality of interchangeable spools is configured to rotate in only a first direction within the valve housing and the at least one second spool is configured to reciprocate in the first direction and an opposite second direction.

6. The gravity-feed dispenser of claim 5, further comprising:
a handle; and
a ratchet plate that connects the handle to any spool of the plurality of interchangeable spools, wherein the ratchet plate comprises:
at least one detent arm;
at least one pawl extending from the at least one detent arm; and
a keyed projection.

7. The gravity-feed dispenser of claim 6, wherein the at least one pawl is configured to releasably engage a ratchet of the first spool of the plurality of interchangeable spools comprising the ratchet; and
wherein the keyed projection is configured to form a keyed connection with the second spool of the plurality of interchangeable spools, the second spool comprising a keyed receptacle configured to receive the keyed projection of the ratchet plate to form the keyed connection.

8. The gravity-feed dispensing system of claim 5, wherein the at least one first spool forms a rotary valve with the valve housing and at least one second spool of the plurality of spools forms a flow metering valve with the valve housing.

9. The gravity-feed dispensing system of claim 5, further comprising a ratchet plate comprising a keyed projection and comprising at least one pawl extending from at least one detent arm, wherein the ratchet plate connects the handle to the spool within the valve housing.

10. The gravity-feed dispenser of claim 5, wherein the first spool comprises a plurality of paddles extending between valve wheels comprising a plurality of exteriorly extending ratchets and the second spool comprises a central passage defined between end walls and cylinder walls.

11. A gravity-feed dispensing system comprising:
a hopper configured to hold a bulk material for dispense, the hopper comprising a mouth;
a dispenser comprising a valve operable between open and closed conditions to selectively permit bulk material to pass from the hopper through an outlet of the dispenser; wherein the dispenser is configured to selectively connect the valve to the mouth of the hopper;
a handle;
a keyed projection extending interior of the valve and mechanically connected to the handle;
a valve housing; and
a spool rotatably positioned within the valve housing, the spool comprises a keyed receptacle configured to receive the keyed projection to transfer movement from the handle to the spool.

12. The gravity-feed dispensing system of claim 11, further comprising a ratchet plate comprising the keyed projection and comprising at least one pawl extending from at least one detent arm, wherein the ratchet plate connects the handle to the spool.

13. A gravity-feed dispensing system comprising:
a hopper configured to hold a bulk material for dispense, the hopper comprising a mouth; and
a dispenser comprising a valve operable between open and closed conditions to selectively permit bulk material to pass from the hopper through an outlet of the dispenser; wherein the dispenser is configured to selectively connect the valve to the mouth of the hopper, wherein the mouth of the hopper is circular and the dispenser comprises a barrel configured to selectively connect the dispenser to the mouth of the hopper;
an agitator configured to translate within the hopper, wherein the agitator comprises a plurality of ribs extending across the agitator in a width dimension and a rib extending centrally along a length dimension, wherein the agitator is flexible about the rib extending centrally along the length dimension.

14. A gravity-feed dispensing system comprising:
a hopper configured to hold a bulk material for dispense, the hopper comprising a mouth;
a dispenser comprising a valve operable between open and closed conditions to selectively permit bulk material to pass from the hopper through an outlet of the dispenser; wherein the dispenser is configured to selectively connect the valve to the mouth of the hopper, wherein the dispenser comprises a valve housing and a spool rotatably positioned within the valve housing; and
a false front compartment connected to the dispenser, the false front compartment open to the valve housing.

15. A gravity-feed dispensing system comprising:
a hopper configured to hold a bulk material for dispense, the hopper comprising a mouth; and
a dispenser comprising a valve operable between open and closed conditions to selectively permit bulk material to pass from the hopper through an outlet of the dispenser; wherein the dispenser is configured to selectively connect the valve to the mouth of the hopper, wherein the dispenser comprises:
an agitator that extends away from the valve and is configured to be received through the mouth into the hopper;
a handle configured to operate the valve between the open and closed conditions; and
an actuator linkage that mechanically connects the agitator to the handle, wherein the actuator linkage comprises:
an external rod exterior of a barrel of the dispenser and operably connected to the handle;

an external crank connected to the external rod;
an internal rod interior of the barrel of the dispenser and operably connected to the actuator;
an internal crank connected to the internal rod; and
a shaft connected between the external crank and the internal crank and extending through the barrel.

16. A gravity-feed dispenser for selective coupling to a hopper of bulk material, the gravity-feed dispenser comprises:
a valve housing;
a spool within the valve housing;
a handle operatively connected to the spool to move the spool within the valve housing between open and closed conditions to selectively permit bulk material to pass through the dispenser housing; and
an agitator that extends away from the valve and is configured to be received into a hopper selectively connectable to the dispenser, wherein the agitator is configured with a rib to fold along a length dimension of the agitator.

17. A gravity-feed dispenser for selective coupling to a hopper of bulk material, the gravity-feed dispenser comprises:
a valve housing;
a spool within the valve housing;
a handle operatively connected to the spool to move the spool within the valve housing between open and closed conditions to selectively permit bulk material to pass through the dispenser housing; and
a false front compartment selectively connected to the dispenser, an interior of the false front compartment open to an interior of the valve housing.

* * * * *